US008068412B1

(12) United States Patent
Cortez et al.

(10) Patent No.: US 8,068,412 B1
(45) Date of Patent: *Nov. 29, 2011

(54) LINK SELECTION SCHEMES FOR AVOIDING CHANNEL CONTENTION

(75) Inventors: Bruce G. Cortez, Freehold, NJ (US); Robert D. Doverspike, Tinton Falls, NJ (US); Rakesh K. Sinha, Edison, NJ (US); John L. Strand, Holmdel, NJ (US); Fang Yu, Albany, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 866 days.

This patent is subject to a terminal disclaimer.

(21) Appl. No.: 12/008,171

(22) Filed: Jan. 9, 2008

Related U.S. Application Data

(63) Continuation of application No. 10/634,935, filed on Aug. 5, 2003, now Pat. No. 7,450,516.

(60) Provisional application No. 60/401,493, filed on Aug. 6, 2002.

(51) Int. Cl.
*H04J 1/16* (2006.01)

(52) U.S. Cl. ........................................ 370/228; 370/238
(58) Field of Classification Search .......... 370/216–228, 370/238, 252, 253, 431, 437
See application file for complete search history.

(56) References Cited

U.S. PATENT DOCUMENTS 6,324,162 B1* 11/2001 Chaudhuri .................... 370/225
7,450,496 B1* 11/2008 Doverspike et al. .......... 370/217

* cited by examiner

Primary Examiner — Ricky Ngo
Assistant Examiner — Kan Yuen
(74) Attorney, Agent, or Firm — Ronald D. Slusky

(57) ABSTRACT

A connection in an optical communication system is routed over a sequence of cross-connects and aggregated links comprising multiple links. A different link selection algorithm is used for service provisioning than is used for restoration, i.e., after a cable cut or other failure or incident has made one or paths in the network suddenly unavailable. In particular, a special link selection algorithm called the Interleave algorithm is used for restoration different from the well known Best-Fit algorithm used for provisioning. The Interleave algorithm substantially reduces the probability of glare while maintaining near-optimum capacity utilization.

12 Claims, 6 Drawing Sheets

LINK SELECTION SCHEMES FOR AVOIDING CHANNEL CONTENTION

CROSS-REFERENCE TO RELATED APPLICATIONS

This is a continuation of U.S. patent application Ser. No. 10/634,935 filed Aug. 5, 2003 now U.S. Pat. No. 7,450,516, which claimed the benefit of U.S. provisional patent application No. 60/401,493 filed Aug. 6, 2002.

BACKGROUND OF THE INVENTION

The present invention relates to techniques for selecting links when setting up paths in transport networks.

The current generation of transport network equipment provides the ability to set up explicit paths in a network by employing various kinds of signalling mechanisms. The network typically consists of nodes—more particularly, cross-connects—interconnected by transport links. For example, a link can be an STS-48 link, containing 48 STS-1 channels. There can be multiple links connecting a pair of cross-connects to form a logical aggregated link. Each link contains multiple bi-directional channels. Connections, such as connection-oriented data streams or TDM circuits, are routed through the network via the cross-connects, wherein each cross-connect routes the data contained in a connection from a set of incoming channels to a set of outgoing channels. The choice of which output channels to transfer the data to depends on a combination of factors such as the identity of incoming channels, header bits, timeslots, wavelengths, etc. Examples of cross-connects include IP routers with MPLS capabilities, digital cross connects, and photonic switches. A few examples of signalling mechanisms for path set-up are RSVP, CR-LDP, and ATM signalling.

A connection is routed over a sequence of cross-connects and selected adjacent links. Consider, for example, a SONET-like network where every connection is assigned a set of channels and each channel belongs to at most one connection. We assume that all the channels assigned to a connection within a single aggregated link must be on a single link. However, channels belonging to a connection within a link do not have to be contiguous.

To set up a connection, first the routing or the management system computes a sequence of cross-connects as a path. Then the signalling system reserves, and ultimately assigns, a set of channels (according to the bandwidth requirement of the connection) between each pair of cross-connects on this path.

There are at least two well-known schemes for link selection. A first one of these is the so-called Best-first algorithm. The Best-fit algorithm chooses the link with the least amount of spare bandwidth that can accommodate a requested connection. Studies have shown that this algorithm is generally the best way to select the links to minimize bandwidth fragmentation. That is, it preserves links with large amount of channels available so that those links can later accommodate requests to set up connections that require a large amount of bandwidth.

Unfortunately, the Best-fit algorithm performs poorly in avoiding the well-known protocol problem known as "glare." Glare may arise when two connection-set-up messages traveling in opposite directions try to reserve the same bi-directional channels, even if other channels and links are available. The first set-up attempt reserves a set of channels on one end of the link and meanwhile, the message traveling in the opposite direction reserves some of these channels on the other end of the same link. Both messages, when they try to reserve the channels on their other ends, find that the channels have already been reserved by another connection and therefore the message is returned as "unsuccessful."

A second scheme for link selection is called Hi-Lo. In the Hi-Lo algorithm every pair of adjacent cross-connects predetermines an ordering of the links connecting them. Then one cross-connect examines all of the links in the decreasing index order and picks the first link that can accommodate the connection. The other cross-connect examines the links in increasing index order and picks the first link that can accommodate the connection. This scheme works very well for glare. However, it makes no attempt to minimize fragmentation and, indeed, can lead to a situation wherein there are only a few links whose bandwidth is not fragmented.

One possible approach for avoiding glare while minimizing fragmentation, is for each pair of neighbouring cross-connect interfaces to select one cross-connect interface as "master" and the other as "slave". The master cross-connect interface is responsible for selecting channels for connections traveling in either direction using, for example, the Best-fit algorithm. If the connection is traveling from master towards the slave cross-connect, the master cross-connect can select links and channels and convey this to the slave cross-connect. For connections traveling from slave to the master cross-connect, an extra signalling message conveying the link/channel selection from master to slave is needed. Disadvantageously, this approach engenders additional signalling overhead.

SUMMARY OF THE INVENTION

We have recognized that it is possible to select the links in a way that addresses both fragmentation and glare and yet does not incur the above-mentioned signalling overhead. In particular, we have recognized that it is advantageous to use a different link selection mechanism for service provisioning than that used for restoration, the latter being the process of the rapid setting up paths in the network after a cable cut or other failure or incident has made one or paths in the network suddenly unavailable. As long as one knows the link selection mechanism used during the service provisioning phase and thus the expected distribution of available bandwidths, a link selection mechanism can be chosen for use during restoration that will reduce fragmentation in addition to reducing glare.

Particular embodiments of our technique take advantage of the fact that glare is usually not an issue for initial connection provisioning because the volume of provisioning/switched connection setups is quite low in transport networks when compared to the time to process a single setup. The main consideration during provisioning is to minimize bandwidth fragmentation. Thus those particular embodiments of the invention utilize for provisioning an algorithm having known bandwidth-fragmentation-minimization properties, such as Best-fit. On the other hand, there are stringent time requirements for setting up paths during a restoration procedure that are not likely to be met by a non-glare-minimizing algorithm such as Best-fit. This is a result of the large amount of time likely to be consumed in resolving the many contentions for links (i.e., instances of glare) that are likely to occur when a great many connections are being restored within a narrow time window. Thus, in accordance with the principles of the invention as stated above, these embodiments use a different algorithm for link selection during restoration.

In particular, we have discovered that carrying out restoration using a link selection mechanism that we refer to as the Interleave algorithm is a good match for the Best-fit algorithm used for provisioning. In particular, assume that the Best-fit algorithm had selected links during provisioning as defined above—namely by choosing the link with the least amount of spare bandwidth that can accommodate a requested connection. Assume further that the links are indexed in a particular order given by an index i=1, 2, 3 . . . K and that in the case of a "tie," i.e., there are multiple links meeting the least-amount-of-spare-bandwidth criterion, the "tie-breaker" criterion is that the link with the lowest index among these was chosen. Experience shows that at the end of all connection provisioning, the available capacity of links will be roughly an increasing function of link index, i. It is highly likely that the highest indexed links have no connections on them at all.

The Interleave algorithm takes advantage of that expected distribution. In illustrative embodiments, the Interleave algorithm pre-defines one cross-connect as "even" and the other as "odd". When the odd cross-connect receives a connection set-up message it examines the links having the indices $\{1, 3, 5, \ldots, M\}$ and selects the link with the smallest available capacity that can still accommodate the connection request. If it cannot find such a link, it examines the remaining links in the index order of $\{N, \ldots 6, 4, 2\}$ and selects the first link in that sequence that can accommodate the request. Here, $M=2*\lceil K/2 \rceil-1$ and $N=2*\lfloor K/2 \rfloor$. That is, M is the largest odd number $\leq K$ and N is largest even number $\leq K$. Similarly, when the even cross-connect receives a connection set-up message, it examines the links having the indices $\{2, 4, 6, \ldots, N\}$ and selects the link with the smallest available capacity that can still accommodate the connection request. If it cannot find a link, it examines the remaining in the index order of $\{M, \ldots, 5, 3, 1\}$ and selects the first link that can accommodate the request.

Note that the Interleave algorithm causes the two cross-connects to consider links in a generally (although not strictly) opposite order from one another, as in Hi-Lo. Thus also as in Hi-Lo, the Interleave algorithm minimizes glare. Unlike Hi-Lo, however, the Interleave algorithm avoids selecting a high-indexed link if a lower-indexed link will accommodate the request. Thus the Interleave algorithm accommodates a connection request by preferentially selecting a link that the Best-fit algorithm had previously selected for other connections.

Thus the high-indexed links—which have the largest amounts of available bandwidth—tend to remain available for assignment to large-bandwidth connections that may need to be set up in the future.

Simulations that we have conducted verify that using Best-fit for provisioning and Interleaving for restoration avoids almost all glare, while keeping fragmentation low.

Other combinations of link selection schemes embodying the principles of the invention can also be used. As noted above, a key determinant in selecting the two algorithms is that the algorithm used for restoration should take into account the expected distribution of available bandwidth that resulted from the algorithm used during provisioning.

DETAILED DESCRIPTION

Figure 1:
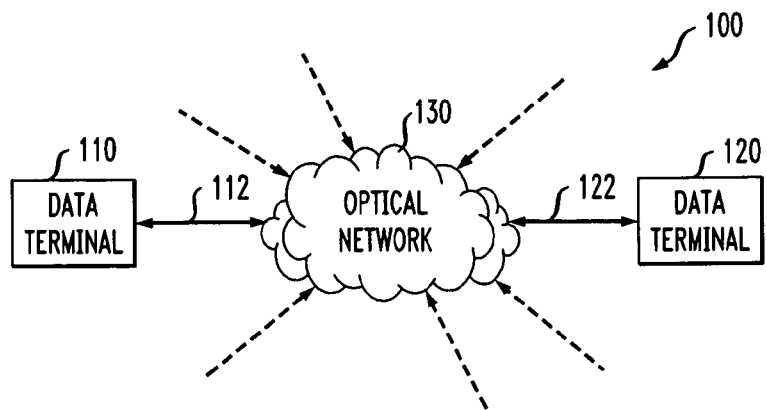
FIG. 1 is a conceptual view of a communication system in which the present invention is illustratively implemented.

FIG. 1 shows an exemplary block diagram of a communication system 100. Communication system 100 includes a first endpoint—illustratively a data terminal 110—connected to an optical mesh network 130 through a first data link 112, and a second endpoint—illustratively a data terminal 120—connected to the optical mesh network 130 through a second data link 122. The optical mesh network 130 supports communication between the first data terminal 110 and the second data terminal 120 by providing an internal communication path capable of transmitting and receiving communication signals over links 112 and 122.

The data terminals 110 and 120 can be any one of a number of different types of devices, such as computers, routers, SONET terminals, ATM switches, cellular phones, satellites, storage devices, or any combination of software and hardware capable of a) generating, relaying or recalling from storage any information capable of being transmitted to the optical mesh network 130, and b) receiving, relaying, storing, sensing or perceiving information transmitted from the optical mesh network 130.

The links 112 and 122 can be any known or hereafter-developed device or system for connecting the data terminals 110 and 120 to the optical mesh network 130. Such devices include direct serial/parallel cable connections, satellite links, wireless links, connections over a wide area network or a local area network, connections over an intranet, connections over the Internet or connections over any other distributed processing network or system. Additionally, the links 112 and 122 can be software devices linking various software systems. In general, the links 112 and 122 can be any known or hereafter-developed connected systems, computer programs or structures usable to connect the data terminals 110 and 120 to the optical mesh network 130.

Communication paths within the optical mesh network 130 can occasionally fail. Upon such failures, the optical mesh network 130 can quickly self-repair by establishing new internal communication paths between links 112 and 122, this process being referred to as "restoration." Any known technique for accomplishing this may be utilized, including, for example, the technique disclosed in the co-pending patent application assigned to the present assignee, Ser. No. 09/474,031 filed Dec. 28, 1999 or in U.S. Pat. No. 6,324,162, both hereby incorporated by reference herein. Upon detection of a problem, the optical mesh network 130 reroutes communication from the failed internal communication path to a new communication path within the network 130, thereby restoring communication.

Figure 2:
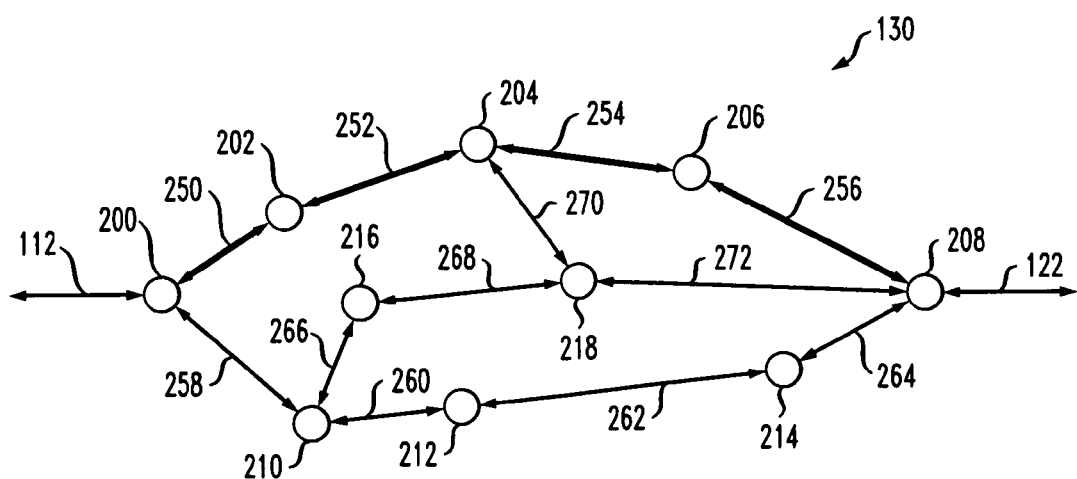
FIG. 2 is a block diagram of an optical mesh network that is illustratively a part of the system of FIG. 1.

FIG. 2 is a block diagram of an illustrative implementation of optical mesh network 130. Network 130 includes cross-connects having even-numbered reference numerals within the range 200-218 (hereinafter collectively referred to as cross-connects 200-218) interconnected through a series of links having even-numbered reference numerals within the range 250-272 (hereinafter collectively referred to as transmission lines 250-272).

Cross-connects 200-218 are capable of passing communication traffic to/from other cross-connects 200-218 via transmission lines 250-272 and to locations external to the mesh network 130. As shown in FIG. 2, cross-connects 200 and 208 are connected to links 112 and 122, respectively, making cross-connects 200 and 208 end cross-connects for the purpose of this example. These end cross-connects 200 and 208 can transform optical communication signals to electrical signals suitable for transmission over links 112 and 122, and conversely can transform electrical signals received over links 112 and 122 to optical signals suitable for transmission throughout the mesh network 130.

In normal operation, mesh network 130 passes communication signals between endpoints via an initially provisioned communication path, also referred to herein as a "service" path. The communication signal can be either unidirectional (one way) or bi-directional (two way). The communication path is formed by at least two cross-connects interconnected by at least one transmission line 250-272. In this example, links 112 and 122 are connected by a communication path (shown in bold) passing along cross-connects 200-202-204-206-208. End cross-connect 200 receives communication signals from data terminal 110 over link 112 and routes the communication signals directly to cross-connect 202 and indirectly to cross-connects 204, 206 and 208 where they are then passed to link 122. Likewise, end cross-connect 208 receives communication signals from data terminal 120 over link 122 and routes the communication signals directly to cross-connect 206 and indirectly to cross-connects 204, 202 and 200 where they are then passed to link 112.

In addition to providing communication paths for the external devices, the various cross-connects 200-218 can also transmit and relay status information and commands to each other. For example, cross-connect 200 can transmit to cross-connect 208 indirectly through cross-connects 202, 204 and 206 information indicating that cross-connect 200 detected a failure in a received communication signal. In response, cross-connect 208 can transmit commands to any of the other cross-connects 202-218 to reroute the signals along another path.

In particular, the end cross-connects 200 and 208 include error detection circuitry that can detect errors in communication signals as they are routed from the mesh network 130 to an external data link 112 and 122. The types of error conditions that can be measured by end cross-connects 200 and 208 include single bit errors, octet errors, cyclic redundancy check (CRC) errors, checksum errors, framing errors and loss of signal errors.

In the event that one of the cross-connects 202-208 or transmission lines 250-256 along a service path fails or is determined to have an unacceptable error condition, the optical mesh network 130 can self-repair by establishing a restoration path. In the exemplary mesh network 130, the restoration path is established by one of the end cross-connects 200 or 208 transmitting commands to other cross-connects 200-218 instructing them to reconfigure themselves to form the restoration path. For example, the restoration path between links 112 and 122 could comprise cross-connects 200, 210, 216, 218 and 208 interconnected by transmission lines 258, 266, 268 and 272.

Once a restoration path has been established and is in use, then that path becomes the service path for the connection.

In this embodiment the invention is implemented in a SONET (or SONET-like) network where every connection is assigned a set of channels and each channel belongs to at most one connection. It is assumed for this example that all the channels assigned to a connection within a single aggregated link must be on a single link. However, channels belonging to a connection within a link do not have to be contiguous.

Figure 3:
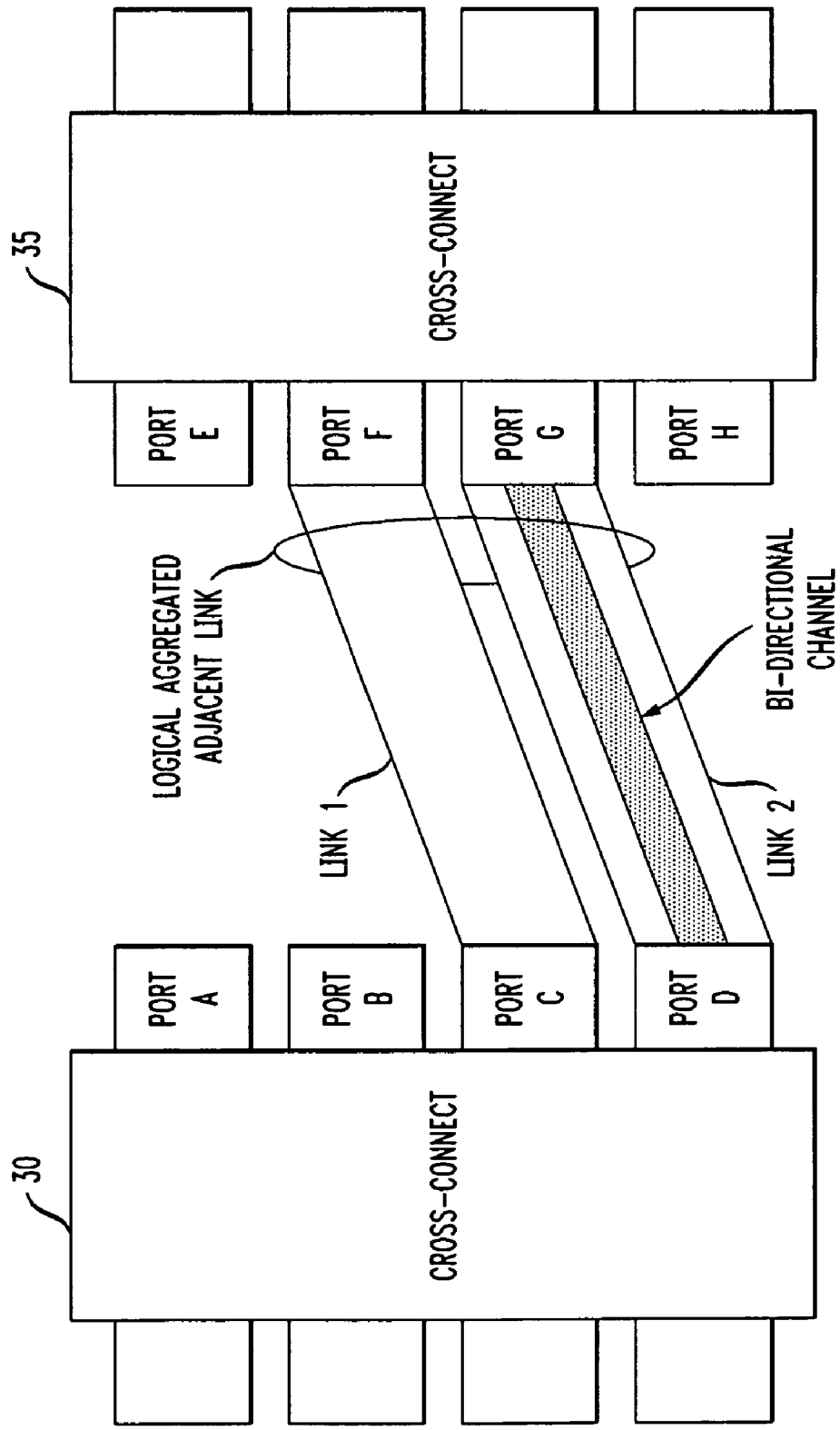
FIG. 3 shows parallel links between two cross-connects within the network of FIG. 3.

To set up a connection, a sequence of cross-connects is computed as a path. Then a set of channels (according to the bandwidth requirement of the connection) is reserved between each pair of cross-connects on this path and assigned to the connection being set up. FIG. 3, for example, shows two cross-connects 30 and 35 along some path. Cross-connects 30 and 35 are representative of any adjacent pair of cross-connects in optical mesh network 130. Each of these cross-connects needs to select a link on its outgoing interface, such as Link 2 and to assign a set of one or more channels (e.g. the shaded channels in FIG. 3) within that link. This link and channel information is conveyed to the incoming interface of the next cross-connect on the path. There can be multiple links connecting a pair of cross-connects and each link contains multiple bi-directional channels. These parallel links form a logical (aggregate) link between these cross-connects, each logical (aggregate) link being the same as what is referred to hereinabove as a transmission line.

Figure 4:
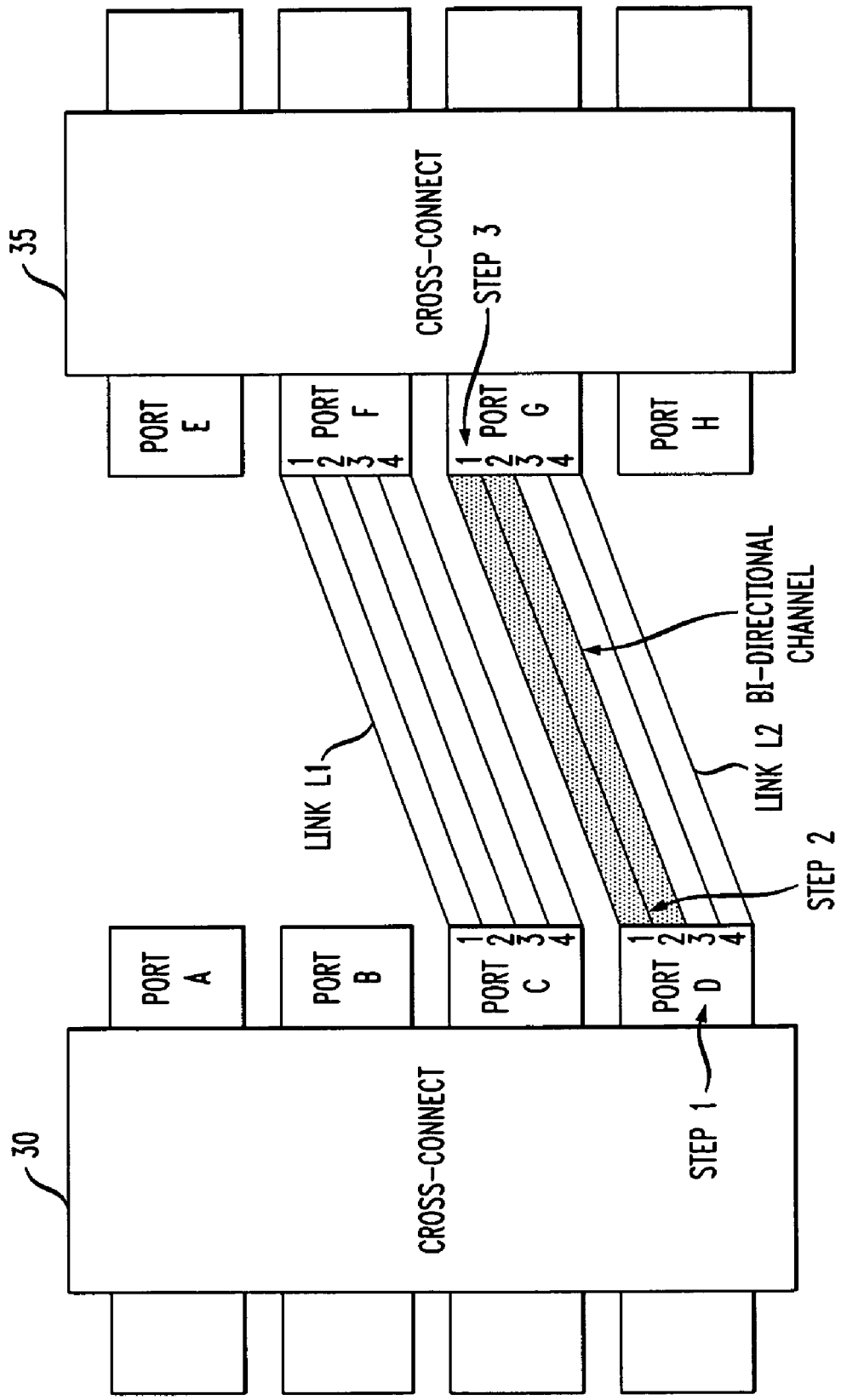
FIG. 4 depicts a channel set-up process between the cross-connects of FIG. 3.

FIG. 4 shows an example of setting up of a connection of two channels from cross-connect 30 to cross-connect 35. There are three basic steps:

Step 1: Select an outgoing link at cross-connect 30, such as link L2 from port D to the next cross-connect on the path—i.e. cross-connect 35. The outgoing link is selected either from among all the links between the cross-connects or from a subset of links between the cross-connects.

Step 2: Identify enough channels such as channels 1 and 2 from port D, inside the selected link (L2) to meet the bandwidth requirement of the connection and reserve those channels on the cross-connect 30. If there are not enough channels for this connection, the path set-up attempt fails.

Step 3: At cross-connect 35, reserve corresponding channels, such as channels 1 and 2 from port G on the incoming link. If the channels are not available on the incoming link, this path set-up attempt fails. If the channels are available, make the channel assignment, and then assign an outgoing channel to the next cross-connect on the path in the same way and so on.

Figure 5:
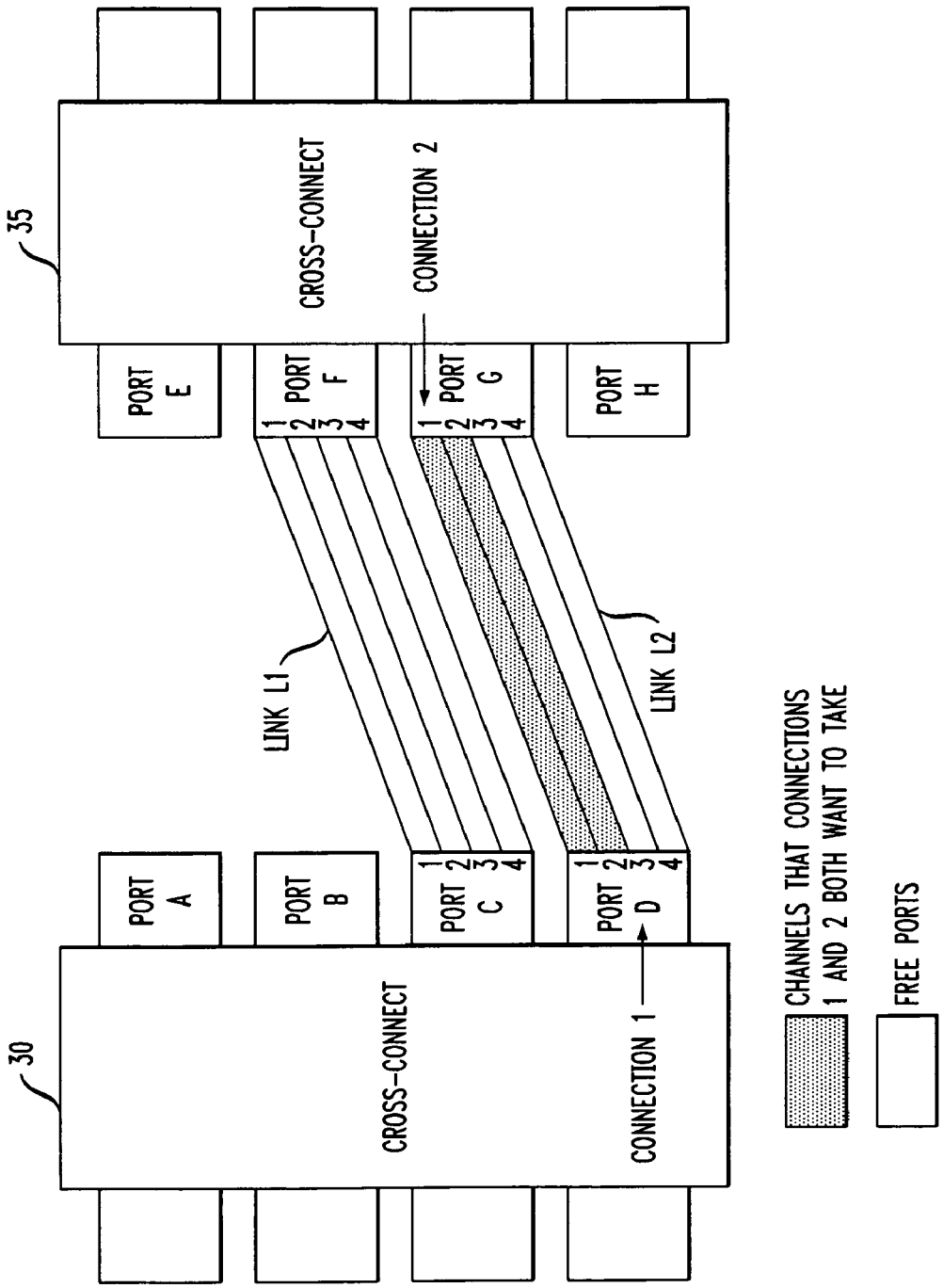
FIG. 5 illustrates the phenomenon referred to as glare.

Glare happens when two path set-up messages traveling in opposite directions try to reserve the same channels. To illustrate, as shown in FIG. 5, the first set-up attempt for connection 1, received at cross-connect 30, reserves channel 1 and channel 2 of link L2. While the first set-up message is in transit is cross-connect 35, a message traveling in the opposite direction received at cross-connect 35 for a different connection—connection 2—reserves one or both of the same channels on the other end of the link L2. Both messages, when they try to reserve the channels on their opposite ends, find that the channels have already been taken by another set-up process and therefore fail. This glare condition can happen even if there is enough capacity on the aggregate link (on link L1 in the above example) for both connections.

Once a link has been chosen, the channel assignment mechanism assigns a set of channels within the link. The choice of link and channel selection/assignment scheme, or algorithm, can significantly affect the performance of the path set-up process. Under the assumption that the channels belonging to a connection do not have to be contiguous, there are no fragmentation issues in channel assignment. To reduce glare, a Hi-Lo scheme can be employed to assign channels within a selected link. Thus one side of the link reserves channels beginning from those with the lowest index, while the other side reserves channels beginning from those with the highest index. This is an optimal channel-assignment scheme because glare will happen only if two connections from different ends are using up all the free bandwidth of the link.

The selection of links, however, is a more complex matter. The present invention is directed to a link selection mechanism that utilizes different algorithms based on the type of path set-up request. Because of the relatively long time periods that typically occur between the initial set-up, or provisioning, of one connection and the initial set-up of another connection, there is not usually much contention during provisioning and therefore glare is not an issue. It is desirable, however, to minimize bandwidth fragmentation. Thus an illustrative embodiment of the invention uses the Best-fit link selection algorithm for provisioning because although it does not guard against glare, little glare is expected to occur anyway, as just noted, and Best-fit does minimize bandwidth fragmentation. Connection set-up requests during restoration, however, have a stringent time requirement. A large number of connections may need to be established within a short time frame. Using a glare-prone algorithm such as Best-fit under these conditions is likely to give rise to a great deal of glare. In accordance with the invention, however, a different algorithm is used for restoration than is used for service provisioning. In particular, in the illustrative embodiment, an Interleave link selection algorithm, described in detail below, is used.

The Best-fit algorithm, in particular, always selects a link with the smallest available capacity that can accommodate a new connection request. If there is a "tie," i.e. there is more than one such link, the "tie-breaker" criterion is that the link with the lowest index is selected. Alternatively stated, the best-fit algorithm is such as to select as a link for a requested connection the lowest-indexed link from among those links that have the smallest amount of unassigned bandwidth that can still accommodate a connection request. The result of this approach is that fragmentation is kept low.

Figure 6:
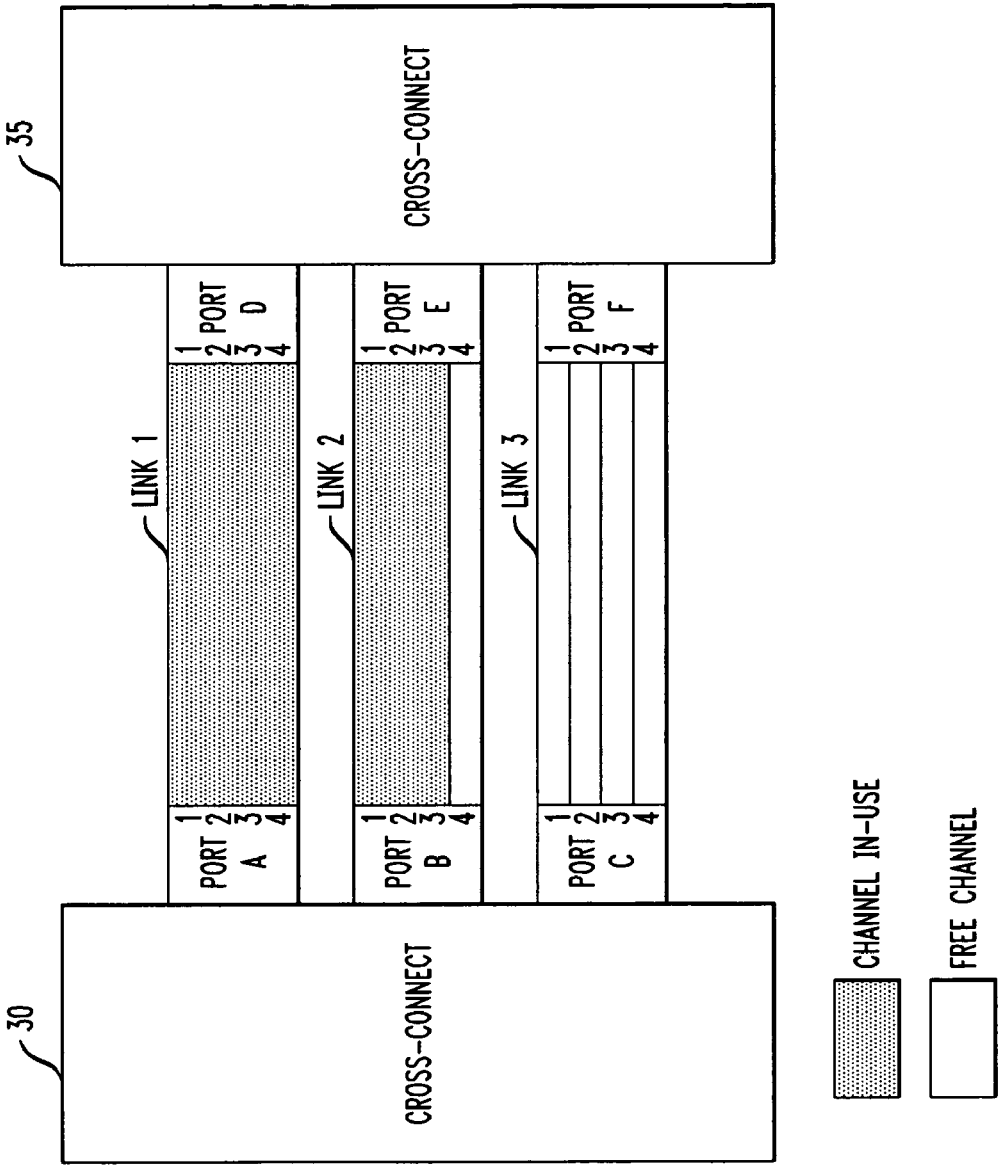
FIG. 6 shows the bandwidth (channels) that are in use and those that are still available to fulfill requests for new connections, after provisioning has been carried out using a Best-fit algorithm.

As a simple example of how the free capacity of different links between a pair of cross-connects might evolve during connection provisioning using Best-fit, assume that all links have the same initial available capacity. For the first provisioning request, all links provide identical packing so the algorithm picks the first link, since it has the lowest index. Now the first link has the smallest available capacity. By the property of Best-fit algorithms, the next several connections will all go to the first link. When the available capacity of the first link cannot support a new request, the second link is selected. The next several connections will be distributed among the first two links and so on. At the end of all connection provisioning, the available capacity of links will be roughly an increasing function of link index as shown in FIG. 6. It is highly likely that the highest indexed links have no connections on them, such as Link 3 in this example.

The present inventors have recognized that for connection restoration, it would be advantageous to accommodate all connections in the first few links if possible while still avoiding glare, thereby maintaining links that have large amounts of available bandwidth available for assignment to large-bandwidth connections that may need to be set up in the future. This is illustratively achieved by using an Interleave algorithm, which is a modified Hi-Lo method on an ordering of links, where both cross-connects are likely to select among the first few links, that is links that Best-fit had previously selected for other connections.

In particular, the Interleave algorithm pre-defines one cross-connect as "even" and the other as "odd" and the odd and even cross-connects preferentially select from mutually exclusive sets of said links. More specifically, when the odd cross-connect receives a connection set-up message, it examines the links having the indices $\{1, 3, 5, \ldots, M\}$ and selects the link with the smallest available capacity that can still accommodate the connection request. (In case of a "tie," i.e., there are multiple links all having that same smallest available capacity, the tie-breaker criterion is illustratively that the link from among those that has the lowest index is chosen.) If the odd cross-connect cannot find such a link, it examines the remaining links in the index order of $\{N, \ldots 6, 4, 2\}$ and selects the first link in that sequence that can accommodate the request. Here, $M=2*\lfloor K/2 \rfloor-1$ and $N=2*\lfloor K/2 \rfloor$. That is, M is the largest odd number $\leq K$ and N is largest even number $\leq K$. Similarly, when the even cross-connect receives a connection set-up message, it examines the links having the indices $\{2, 4, 6, \ldots, N\}$ and selects the link with the smallest available capacity that can still accommodate the connection request and, if necessary, the above tie-breaker criterion is illustratively used. If it cannot find a link, it examines the remaining in the index order of $\{M, \ldots, 5, 3, 1\}$ and selects the first link that can accommodate the request.

This approach causes the two cross-connects to consider links in a generally opposite order while avoiding high-indexed links if lower-indexed links can be used to fulfill the connection request.

Figure 7:
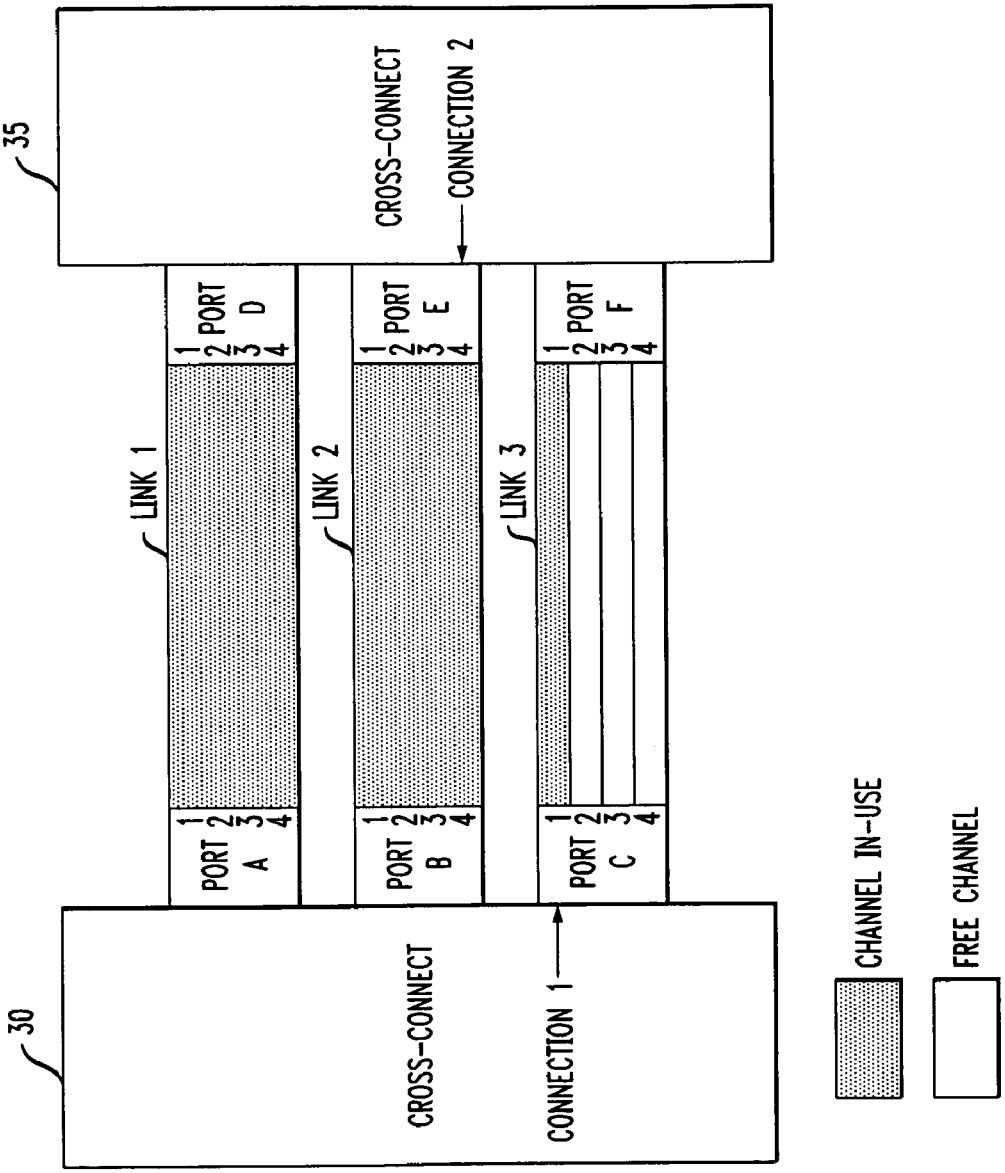
FIG. 7 illustrates how fragmentation is minimized, while glare is avoided, by using the Interleave algorithm after the channels have been provisioned using the Best-fit algorithm.

FIG. 7 shows an example of how the Interleave algorithm works. After the provisioning phase, which illustratively uses the Best-fit algorithm for link selection, the remaining capacities of all links are as shown in FIG. 6. In this example, K=3, M=3 and N=2. Suppose two connections come from different ends, each requesting one channel. According to the Interleave algorithm, connection 1 will first try links in the odd set $\{1, 3\}$, and will pick link 3 since link 1 is full and link 3 has sufficient available bandwidth for the requested connection. If link 1 was not full and had a smaller amount of available bandwidth than link 3, then link 1 would have been chosen. If both links 1 and 3 had had the same amount of available bandwidth, link 1 would have been chosen, since it has the smaller index. If neither link 1 nor link 3 had sufficient available bandwidth, then connection 1 would have tried link 2 from the even set. Conversely, connection 2 will first try links in the even set $\{2\}$ and, indeed, picks link 2, it being assumed that link 2 has sufficient available bandwidth for the requested connection. If link 2 did not have sufficient available bandwidth, then connection 2 would have tried link 3 and then link 1. In this way, two connections are arbitrated to different links. If the Best-fit algorithm were to have been used, both connections would have selected link 2, thus potentially causing glare.

Although the Interleave algorithm can reduce the chance of both cross-connects selecting the same link, thus reducing glare, nothing short of a full handshaking scheme, like master/slave, can eliminate glare completely: For example, glare will still happen when both requests are relatively large, e.g., STS-12 and only one link between the two cross-connects has enough free bandwidth to accommodate these requests. Therefore, these two connections both select this link and glare may happen. In this case, although there is sufficient bandwidth for one of the two connections, both will get rejected because of the glare condition. However, this situation typically occurs only when a number of conditions occur simultaneously: 1) large bandwidth requests from different directions, 2) connection requests very close in time, and 3) insufficient bandwidth. Therefore, the probability of this happening is low.

Use of the Interleave algorithm for restoration after Best-fit had been used for service provisioning maintains relatively low fragmentation because the natural effect of the Best-fit algorithm will be to leave the free bandwidth of the aggregate link in roughly increasing order and the Interleave algorithm simulates two Best-fit selections among the low-indexed links. In this sense the Interleave algorithm can be thought of as being in two versions—the one that the odd cross-connect uses and the one that the even cross-connect uses. The advantages of the Interleave algorithm over Hi-Lo lies in the assumption that the Best-fit link selection scheme has been used during the service provisioning phase, which leaves available bandwidths in a certain order. This observation can be generalized. As long as we know the link selection mechanism used during the service provisioning phase and thus the expected distribution of available bandwidths, we can tailor the link selection mechanism during restoration to reduce fragmentation in addition to reducing glare.

It will be observed that the Interleave algorithm described hereinabove causes the odd cross-connect to select whichever of all the odd-numbered links $\{1, 3, 5, \ldots M\}$ has the smallest available bandwidth that can accommodate a connection request, irrespective of index order. Index order is considered by the odd cross-connect only if it is forced to go to the even-numbered links $\{N, \ldots, 6, 4, 2\}$ to find a link that can accommodate a particular connection request. Thus, for example, if both the $1^{st}$ and $M^{th}$ links have enough unassigned bandwidth to accommodate a request, but the $M^{th}$ link has less available bandwidth than the $1^{st}$, an odd cross-connect will choose the $M^{th}$ link rather than the $1^{st}$. A similar observation can be made vis-à-vis the even cross-connects. The possibility of glare could be reduced even further if, instead of the foregoing, the Interleave algorithm always took index order into account, thereby choosing the $1^{st}$ rather than the $M^{th}$ link in the above example. (Such an approach would cause the two cross-connects to consider links in a strictly opposite order from one another, as in Hi-Lo.) Such an approach, however, will give rise to more fragmentation. It appears that the best overall balance between reducing fragmentation and reducing glare is achieved by using the Interleave algorithm in the form presented hereinabove.

The designations of odd and even are with respect to a particular cross-connect pair. That is, a cross-connect could be designated as odd vis-à-vis one of the cross-connects to which it is connected and could be designated as even vis-à-vis one of the cross-connects to which it is connected. Each cross-connect is programmed to determine whether it will be odd or even, and thus to determine which version of the Interleave algorithm it will use—that is, the version that initially looks for a link among those indexed $\{1, 3, 5, \ldots M\}$ or the version that initially looks for a link among those indexed $\{2, 4, 6, \ldots, N\}$. The determination is made as a function of information that the cross-connect receives in any convenient way. For example, the odd/even assignment could be made off-line by an operator. Or the assignment could be made via a separate protocol that runs as soon as a cross-connect is installed and brought up into service. Indeed, there exist standard protocols for devices such as cross-connects to exchange a variety of information about each other. One popular solution is for adjacent cross-connects to learn each others' ID number and for the high-ID node to become odd and the low-ID node to become even or vice versa The following is the pseudo-code for Interleave algorithm.

```
Interleave Link Selection Algorithm for Restoration Path Setup
int link_selection( int b)
{
    if "Odd XC"
        up = 1; down = N;
    else if "Even XC"
        up = 2; down = M;
```

```
COMMENT: Try to find a best-fit link among the first K/2 links
    int Min = MAX_INT;
    int Opti_link = -1;
    for( i = up; i ≤ K; i +=2)
        if(avail[i] ≧ b && avail[i]<Min){
            Min = avail[i];
            Opti_link = i;
        }
    if(Opti_link ≧ 0)
        return Opti_link;
COMMENT: Find first available link among the last K/2 links
    for( i = down ; i >= 1; i -= 2)
        if(avail[i] ≧ b)
            return i;
    return -1;
}
```

The foregoing merely illustrates the present invention.

For example, the disclosed embodiment uses Best-fit for provisioning and Interleave for restoration. However, the choice of those two particular algorithms is but one implementation of the general principle of the invention—that being the use of different link-selection algorithms for different types of path set-up requests, e.g., provisioning on the one hand and restoration on the other.

The choice of those two particular algorithms is also illustrative of an advantageous implementational aspect of the invention wherein an algorithm to be used second (e.g., for restoration) is selected based on a presumed available bandwidth distribution resulting from use of an algorithm used first (e.g., for provisioning).

Although it was assumed in the above example that all links have the same initial available capacity, the disclosed technique can be generalized as long as the initial distribution of the available capacities is known.

The assignment of particular indices to particular links is arbitrary. It will thus be appreciated that wholly equivalent to the best-fit and interleave algorithms disclosed herein could be a scheme in which a) the highest-indexed link rather than the lowest-indexed link, is used as the aforementioned "tie breaker" criterion and b) the odd (even) cross-connect, when examining the even (odd) links, considers them in ascending order rather than descending order.

Those skilled in the art will be able to devise numerous alternative arrangements which, although not explicitly shown or described herein, embody the principles of the invention and thus are within their spirit and scope.

The invention claimed is:

1. A method for use in a network in which multiple parallel links, which each have multiple channels, interconnect first and second network nodes, said method comprising:
    reserving channels of particular ones of said parallel links for requested connections between said first and second nodes, wherein ones of said channels in ones of said parallel links were previously reserved for other connections between said nodes using a first link selection algorithm that selects for each connection a particular link from among the multiple parallel links;
    wherein said reserving comprises subsequently responding to requests for connections between said first and second nodes by utilizing a second link selection algorithm different from said first link selection algorithm to select a particular link for each requested connection from among the multiple parallel links;
    wherein said first algorithm is of a type that causes less bandwidth fragmentation than said second algorithm, said second algorithm is of a type that causes less glare than said first algorithm, and said second algorithm is such as to select as said particular link a link that said first algorithm had previously selected for said other connections when channels for a requested connection are available on said link that said first algorithm had previously selected;

wherein said nodes operate in a communication network in which initially provisioned connections are made between pairs of endpoints, wherein restoration connections are made between at least particular pairs of said endpoints upon failure of the initially provisioned connections between those endpoints;

wherein said first algorithm is used to initially provision said other connections;

wherein said requested connections are ones of said restoration connections; and wherein one of two versions of said second algorithm is used when said first node receives a connection request and wherein the other of said two versions of said second algorithm is used when said second node receives a connection request.

2. The invention of claim 1 wherein said glare is a situation in which said first node mad said second node substantially concurrently attempt to reserve at least a particular one of said channels for respective different connections.

3. The invention of claim 1 wherein said first algorithm is a best-fit algorithm and said second algorithm is an interleave algorithm.

4. The invention of claim 3 wherein there are K of said links having indices 1, 2, ..., K, and said best-fit algorithm is such as to select as a link for a requested connection the lowest-indexed link from among those of said links that have the smallest amount of unassigned bandwidth that can still accommodate the connection request.

5. The invention of claim 3 wherein each of said nodes is a cross-connect.

6. A method for use in a network in which multiple parallel links, which each have multiple channels, interconnect first and second network nodes, said method comprising:

reserving channels of particular ones of said parallel links for requested connections between said first and second nodes, wherein ones of said channels in ones of said parallel links were previously reserved for other connections between said nodes using a first link selection algorithm that selects for each connection a particular link from among the multiple parallel links;

wherein said reserving comprises subsequently responding to requests for connections between said first and second nodes by utilizing a second link selection algorithm different from said first link selection algorithm to select a particular link for each requested connection from among the multiple parallel links;

wherein said first algorithm is a best-fit algorithm and said second algorithm is an interleave algorithm;

wherein there are K of said links having indices 1, 2, ..., K, and said best-fit algorithm is such as to select as a link for a requested connection the lowest-indexed link from among those of said Links that have the smallest amount of unassigned bandwidth that can still accommodate the connection request, and wherein said interleave algorithm is such that, said first node selects said particular link from a first set of said links when there is a link in said first set of links having channels available for a requested connection, said first node selects said particular link from a second set of said links when there is no link in said first set of links having channels available for a requested connection but there is a link in said second set of links having channels available for the requested connection;

said second node selects said particular link from said second set of said links when there is a link in said second set of links having channels available for the requested connection;

said second node selects said particular link from the first set of said links when there is no link in said second set of links having channels available for the requested connection but there is a link in said first set of links having channels available for the requested connection; and one of said first and second sets of links comprises the ones of said links whose indices are odd numbered and the other one of said first and second sets of links comprises the ones of said links whose indices are even numbered.

7. A communication network node for use in a communication network in which initially provisioned connections are made between pairs of endpoints, and wherein restoration connections are made between at least particular pairs of said endpoints upon failure of the initially provisioned connections between those endpoints, said network node being adapted to be connected to a second communications network node by multiple parallel links between said network node and said second communications network node, each of said links having multiple channels, said network node comprising:

at least one port; and means for reserving at least one channel of a particular one of said multiple parallel links for a requested connection between said network node via said port and said second communications network node using a selected one Of two different link selection algorithms, each of which is an algorithm for selecting said particular one of said multiple parallel links between said network node and said second communications network node;

a first one of said algorithms being used when the requested connection is an initially provisioned connection and a second one of said algorithms being used when the requested connection is a restoration connection;

wherein said first algorithm is of a type that causes less bandwidth fragmentation than said second algorithm, said second algorithm is of a type that causes less glare than said first algorithm, and said second algorithm is such as to select, as said particular one of said links, a link that said first algorithm had previously selected for said other connections when channels for a requested connection are available on said link that said fast algorithm had previously selected; and wherein said means for reserving is adapted to utilize the selected one of two versions of said second algorithm as a function of information received by said network node.

8. The invention of claim 7 wherein said glare is a situation in which said network node and said second communications node substantially concurrently attempt to reserve at least a particular one of said channels for respective different connections.

9. The invention of claim 7 wherein said first algorithm is a best-fit algorithm and said second algorithm is an interleave algorithm.

10. The invention of claim 9 wherein there are K of said links having indices 1, 2, ..., K, and said best-fit algorithm is such as to select as a link for a requested connection the lowest-indexed link from among those of said links that have the smallest amount of unassigned bandwidth that can still accommodate the connection request.

11. A communication network node for use in a communication network in which initially provisioned connections are made between pairs of endpoints, and wherein, restoration connections are made between at least particular pairs of said endpoints upon failure of the initially provisioned connections between those endpoints;
- said network node being adapted to be connected to a second communications network node by multiple parallel links between said network node and said second communications network node, each of said links having multiple channels, said network node comprising:
- at least one port; and
- means for reserving at least one channel of a particular one of said multiple parallel links for a requested connection between said network node via said port and said second communications network node using a selected one of two different link selection algorithms, each of which is an algorithm for selecting said particular one of said multiple parallel links between said network node and said second communications network node; and
- a first one of said algorithms being used when the requested connection is an initially provisioned connection and a second one of said algorithms being used when the requested connection is a restoration connection;
- wherein said first algorithm is a best-fit algorithm and said second algorithm is an interleave algorithm;
- wherein there are K of said links having indices 1, 2, . . . , K;

wherein said best-fit algorithm is such as to select as a link for a requested connection the lowest-indexed link from among those of said links that have the smallest amount of unassigned bandwidth that can still accommodate the connection;
- wherein said interleave algorithm is such that said network node selects said particular link from a first set of said links when there is a link in said fast set of links having channels available for a requested connection, and from a second set of said links when there is no link in said first set of links having channels available for a requested connection but there is a link in said second set of links having channels available for the requested connection; and
- wherein one of said first and second sets of links comprises the ones of said links whose indices are odd numbered and the other one of said first and second sets of links comprises the ones of said links Whose indices are even numbered.

12. A method for use in a communication network of a type comprising a plurality of cross-connects, individual pairs of said cross-connects being interconnected by multiple parallel links, each of said links having multiple channels, the method comprising:
- provisioning an initial path through said network between endpoints served by said network by provisioning connections between pairs of said cross-connects along said initial path, each of said connections comprising particular channels of particular ones of the multiple parallel links interconnecting said pairs of cross-connects, said initial connections being established using a best-fit algorithm to select the Kinks for the connections along said initial path; and
- responsive to a failure of at least one of said paths, establishing a restoration path through said network between the failed path's endpoints by establishing restoration connections between pairs of said cross-connects along said restoration path, each of said restoration connections comprising particular channels of particular ones of said multiple parallel links interconnecting the pairs of cross-connects along said restoration path, said restoration connections being established using an interleave algorithm to select the links for the connections along the restoration path;
- wherein there are K of said links having indices 1, 2, . . . , K;
- wherein said best-fit algorithm is such as to select as a link for a connection between a pair of said cross-connects the lowest-indexed link from among those of the links interconnecting that pair of cross-connects that have the smallest amount of unassigned bandwidth that can still accommodate the connection request,
- wherein said interleave algorithm is such that
  - a first cross-connect of said particular pair of cross-connects responds to each request to establish a restoration connection between itself and the second cross-connect of said particular pair of cross-connects by selecting a link for that restoration connection from a first set of the links interconnecting that particular pair of cross-connects when there is a link in said first set of links having channels available for a requested connection and by selecting a link for that restoration connection from a second set of the links interconnecting that particular pair of cross-connects when there is no link in said first set of links having channels available for a requested connection but there is a link in said second set of links having channels available for the requested connection, and
  - said second cross-connect responds to each request to establish a restoration connection between itself and said first cross-connect by selecting a link for that restoration connection from a second set of said links interconnecting that particular pair of cross-connects when there is a link in said second set of links having channels available for a requested connection and by selecting a link for that restoration connection from said first set of the links interconnecting that particular pair of cross-connects when there is no link in said second set of links having channels available for a requested connection but there is a link in said first set of links having channels available for the requested connection,
- and wherein one of said first and second sets of links comprises the ones of said links whose indices are odd-numbered and the other one of said first and second sets of links comprises the ones of said links whose indices are even-numbered.

* * * * *